United States Patent
Farrell

(10) Patent No.: US 8,590,863 B1
(45) Date of Patent: Nov. 26, 2013

(54) FENCING TOOL

(71) Applicant: Terry C. Farrell, Conneaut Lake, PA (US)

(72) Inventor: Terry C. Farrell, Conneaut Lake, PA (US)

(73) Assignee: Channellock, Inc., Wilmington, DE (US)

( * ) Notice: Subject to any disclaimer, the term of this patent is extended or adjusted under 35 U.S.C. 154(b) by 0 days.

(21) Appl. No.: 13/735,307

(22) Filed: Jan. 7, 2013

Related U.S. Application Data

(60) Division of application No. 13/311,718, filed on Dec. 6, 2011, now Pat. No. 8,413,555, which is a continuation-in-part of application No. 13/267,431, filed on Oct. 6, 2011, now Pat. No. 8,291,794, which is a continuation-in-part of application No. 12/751,204, filed on Mar. 31, 2010, now Pat. No. 8,065,939, which is a division of application No. 12/419,592, filed on Apr. 7, 2009, now Pat. No. 8,061,239, which is a continuation-in-part of application No. 11/857,010, filed on Sep. 18, 2007, now Pat. No. 8,485,074, which is a continuation-in-part of application No. 11/493,682, filed on Jul. 26, 2006, now abandoned.

(51) Int. Cl.
*B21F 9/00* (2006.01)
*B66F 3/00* (2006.01)

(52) U.S. Cl.
USPC ............ 254/243; 81/415; 81/427.5; 7/117; 7/127

(58) Field of Classification Search
USPC ............ 254/243, 223, 224, 226; 81/415–418, 81/427.5, 180.1, 183, 184; 7/117, 127
See application file for complete search history.

(56) References Cited

U.S. PATENT DOCUMENTS

| | | | | |
|---|---|---|---|---|
| 1,396,502 | A * | 11/1921 | Buck | 254/223 |
| 1,949,335 | A | 7/1929 | Settles | |
| 2,179,438 | A * | 11/1939 | Stewart | 254/243 |
| 2,875,520 | A * | 3/1959 | Webster | 30/254 |
| 3,599,255 | A | 8/1971 | Carroll, Sr. | |
| 3,874,638 | A * | 4/1975 | Langlie et al. | 254/243 |
| 5,303,748 | A * | 4/1994 | Haldemann | 140/123 |
| 5,339,507 | A * | 8/1994 | Cox | 29/267 |
| 5,522,290 | A | 6/1996 | Visser et al. | |
| 5,586,584 | A | 12/1996 | Haldemann | |
| 5,695,147 | A * | 12/1997 | Zimmerman | 242/388.3 |
| 6,050,549 | A | 4/2000 | Foy | |
| 6,477,747 | B1 * | 11/2002 | Flagg | 24/68 CD |
| 6,820,862 | B2 | 11/2004 | Terzagi | |
| 2002/0063247 | A1 | 5/2002 | Terzagi | |
| 2006/0156474 | A1 | 7/2006 | Gillingham | |
| 2009/0056509 | A1 * | 3/2009 | Anderson | 81/342 |
| 2010/0051887 | A1 * | 3/2010 | Wooster et al. | 254/217 |

* cited by examiner

*Primary Examiner* — Emmanuel M Marcelo
(74) *Attorney, Agent, or Firm* — Lackenbach Siegel, LLP

(57) ABSTRACT

A pliers fencing tool includes a wedge having a through slot for engagement with the rotatably mounted ratcheted sprocket teeth of a fence wire strainer suspended between the fence wire looped ends. Through slot engaged caused the teeth to rotate from a first to a second ratcheted position and thereby strain the fence wire. A grip having a thumb receiving recess and thumb guard is provided between the wedge and the means for pivotably connecting the handles, and the handles are gripped at the grip portion with the wedge distally disposed.

12 Claims, 7 Drawing Sheets

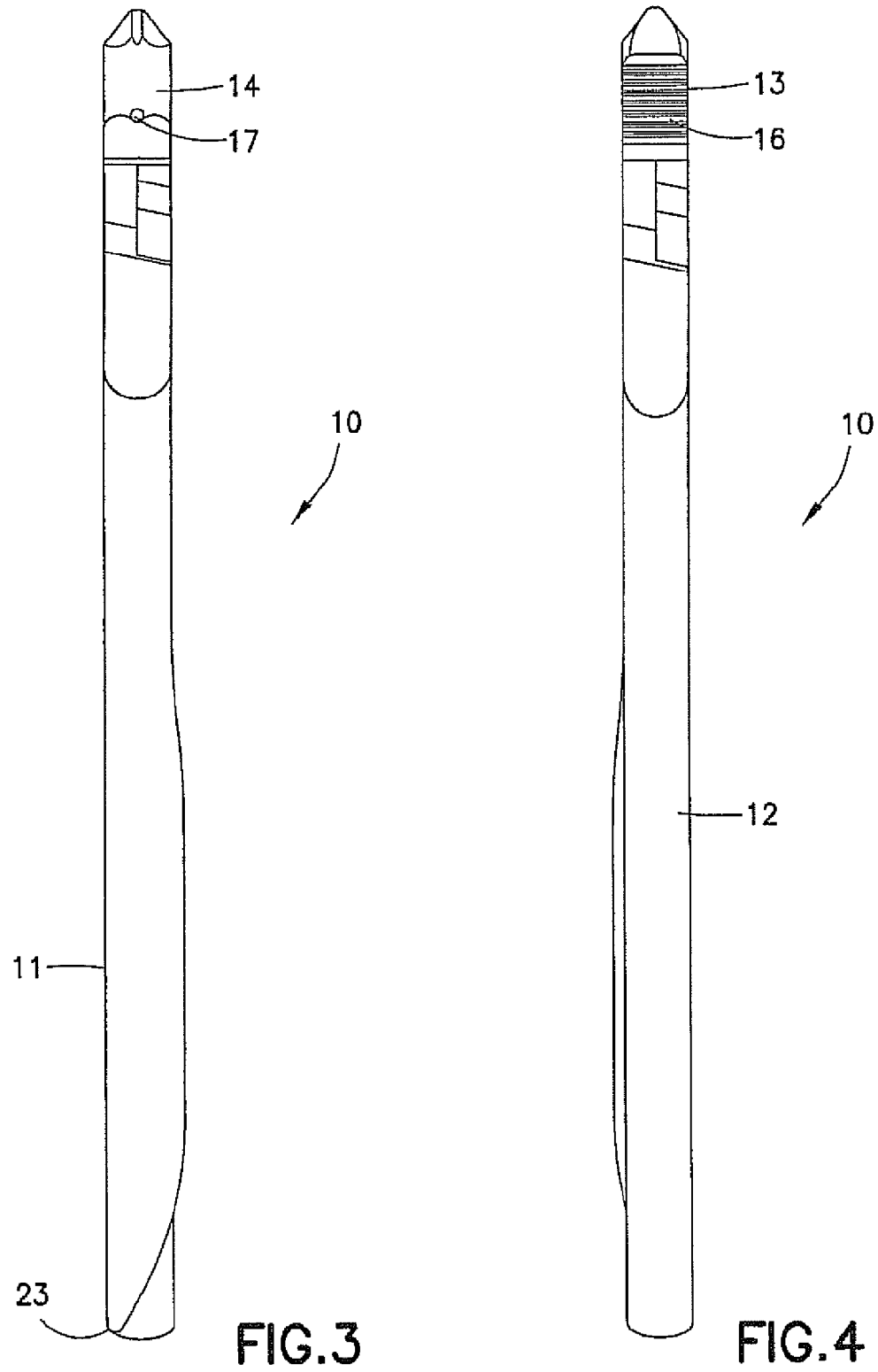

FENCING TOOL

PRIOR RELATED APPLICATIONS

This application is a divisional application of Ser. No. 13/311,718, filed Dec. 6, 2011, now U.S. Pat. No. 8,413,555, which is a continuation-in-part of Ser. No. 13/267,431. Filed Oct. 6, 2011, now U.S. Pat. No. 8,291,794, which is a continuation-in part of divisional patent application Ser. No. 12/751,204, filed Mar. 31, 2010, now U.S. Pat. No. 8,065,939, which is a divisional application of Ser. No. 12/419,592, filed Apr. 7, 2009, now U.S. Pat. No. 8,061,239, which is continuation-in-part of application Ser. No. 11/857,010, filed Sep. 18, 2007, which is a continuation-in-part of application Ser. No. 11/493,682, filed Jul. 26, 2006, and claims priority thereto and incorporates the priority applications herein in their entireties by reference thereto.

FIELD OF THE INVENTION

This invention relates to tools in fencing operations. Specifically, this invention relates to tools for multiple fence wire operations. More specifically, this invention relates to a tool operable with a fence wire strainer.

BACKGROUND AND DISCUSSION OF THE PRIOR ART

Fencing tools having multiple functionalities are disclosed in U.S. Pat. No. 5,303,748, granted Apr. 19, 1994 and U.S. Pat. No. 5,586,584, granted Dec. 24, 1996 to Haldemann. Wire strainers are disclosed in US2002/0063247, published May 30, 2002 to Terzagi and US2010/0051887, published Mar. 4, 2010 to Wooster et al. The foregoing disclosures are incorporated herein in their entireties by reference thereto.

The fencing tool art does not provide effective functionality with fence wire strainers. The fencing tool art desires a tool that retains and does not impair prior fencing functionalities and yet provides effective wire strainer functionality. The present invention provides a solution to the art desired needs as aforesaid.

SUMMARY OF THE INVENTION

The invention, in one aspect, is a fencing tool having multiple functionalities including operability for and in combination with a wire strainer.

The invention, in still another aspect, is a pliers fencing tool that provides wire strainer functionality.

The fencing tool as aforesaid, in one embodiment, includes a handle through hole for operably engaging the rotatable ratcheted sprocket teeth of a wire strainer.

The fencing tool, as aforesaid, in a further aspect, includes a handle wedge for removing fence clips from fence posts.

The fencing tool, in still a further embodiment, includes a T-shaped section grip portion adjacent the wedge, which provides a left or right hand thumb receiving recess and raised portion thumb guard for use in fence wire straining and fence clip removing operations.

The invention, in another aspect, is a method of operability engaging a wire strainer to strain a fence wire with the aforesaid fencing tool. The method includes the following steps:
 (i) providing a fencing tool having a first handle and a second handle, and first and second, respective, distally disposed jaws, and a pivot pin for pivotably connecting the handles and respective jaws, so that the tool is disposed in an opened disposition and a closed disposition, and the first handle having a first surface and a second surface being formed with a wedge extending from the second surface upwardly to the first surface terminating at a wedge edge, and also having a through slot extending from the first surface to the second surface; and wherein the first handle first and second surfaces constitute a grip portion;
 (ii) gripping the handles at the grip portion so that the first surface is downwardly and facingly disposed to a wire strainer with the wedge edge distally disposed;
 (iii) engaging the rotatable ratchet teeth of the fence wire strainer in the through slot; and
 (iv) moving the tool to exert a force on the engaged ratchet teeth to rotate the ratchet teeth from a first to a second ratcheted position.

BRIEF DESCRIPTION OF THE DRAWINGS

FIG. 3 is a right side view of the tool of FIG. 2;
FIG. 4 is a left side view of the tool of FIG. 2.

DESCRIPTION OF THE PREFERRED EMBODIMENTS

Figure 1:
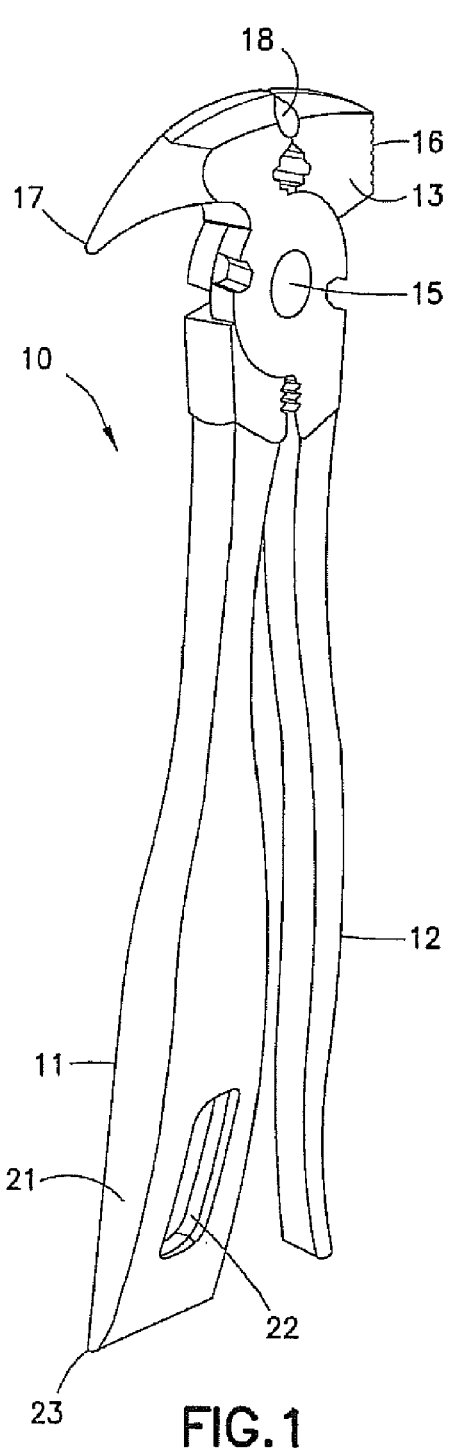
FIG. 1 is a front perspective view of the fencing tool in the closed disposition.
Figure 2:
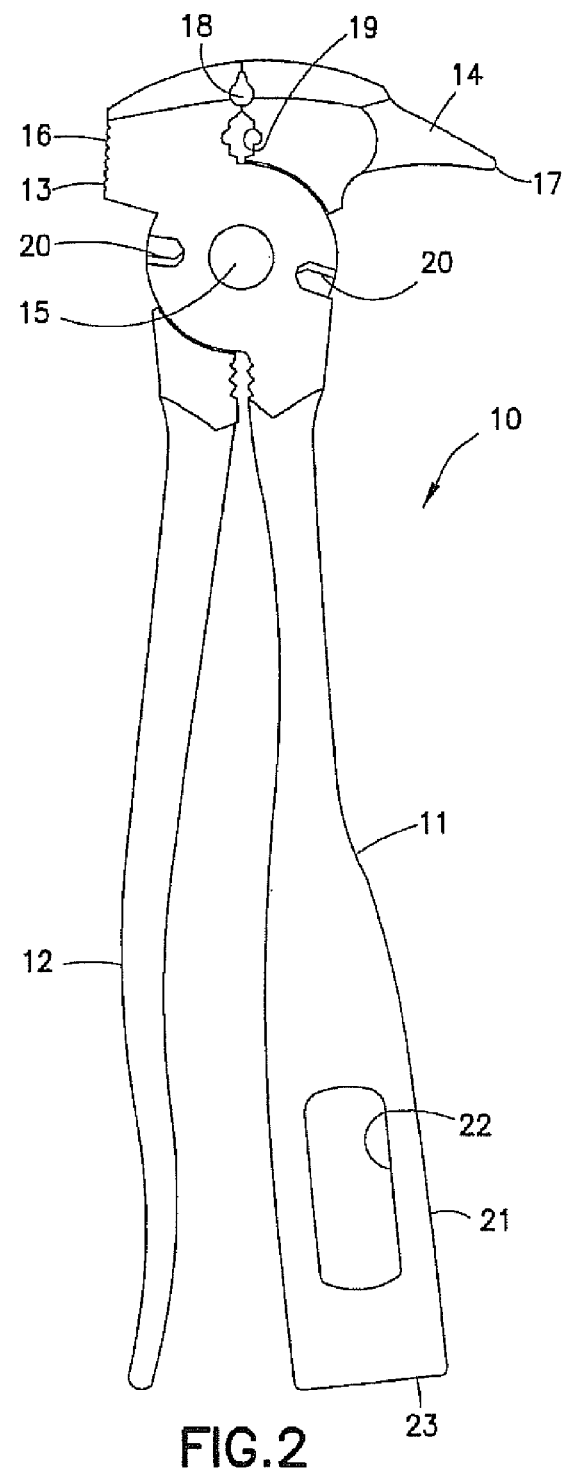
FIG. 2 is a front planar view of the tool of FIG. 1.

Referring to FIGS. 1-5, there is shown fencing tool 10 of the present invention. Tool 10 includes handles 11 and 12, jaws 13 and 14, and pin or member 15 for pivotably connecting the jaws and handles. Jaw 13 includes fence hammer 16. Jaw 14 includes fence staple starter and puller 17. Fence wire stretcher, splicer and cutter 18, 19 and 20 are construction features of the jaws. The foregoing fencing functionality features are known in commercially available fencing tools.

Handle 11 is formed with wedge 21 having elongated through hole or slot 22, for purposes hereinafter appearing.

Figure 6:
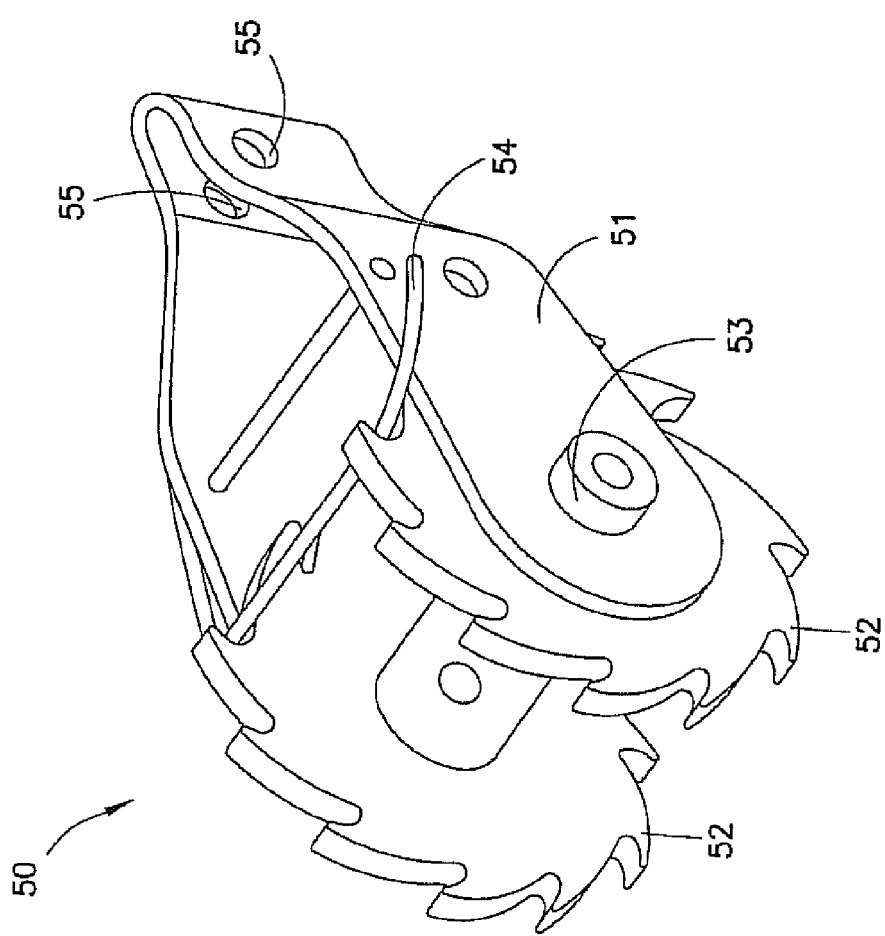
FIG. 6 is a first front perspective view of a wire strainer.
Figure 7:
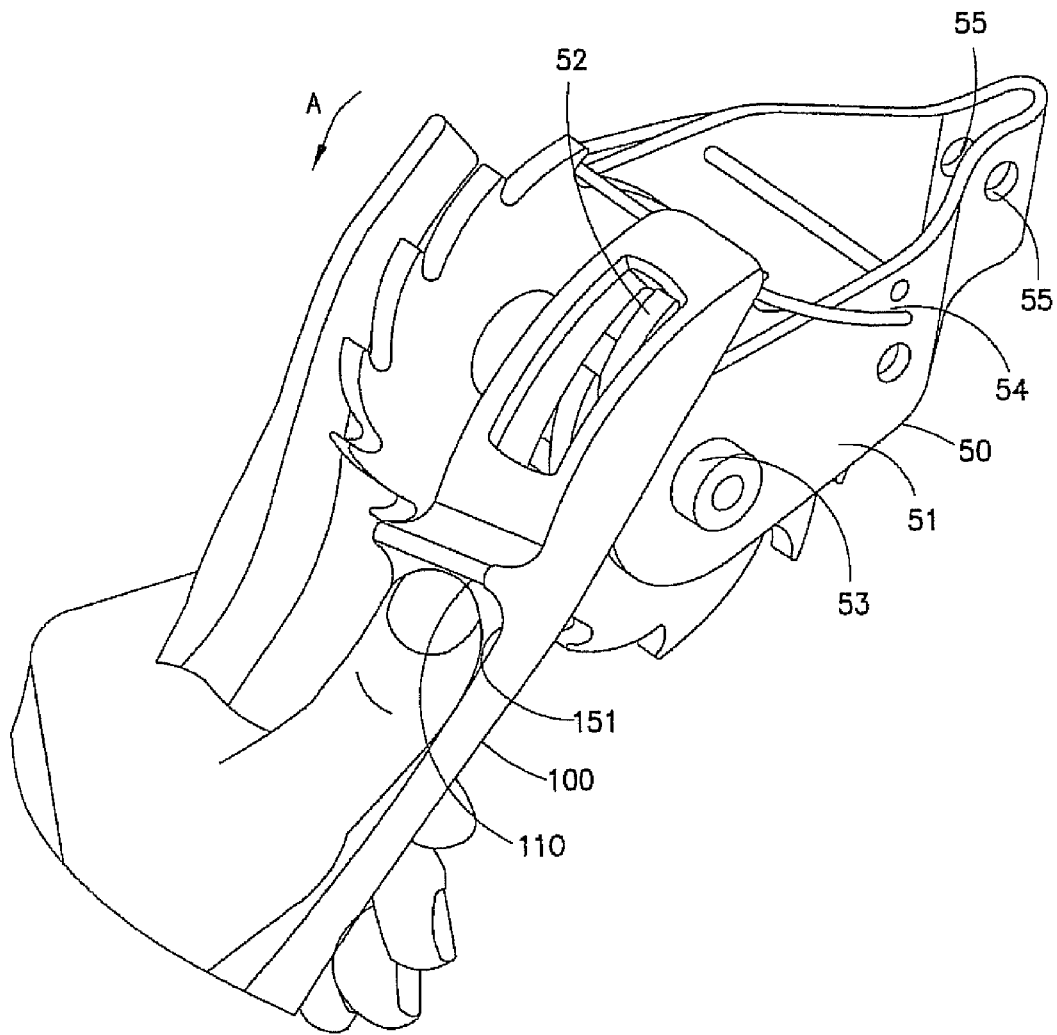
FIG. 7 is a second front perspective view of the wire strainer of FIG. 6 engaged by the wedge slot handle of a second embodiment of the tool as shown in FIGS. 1-5.
Figure 8:
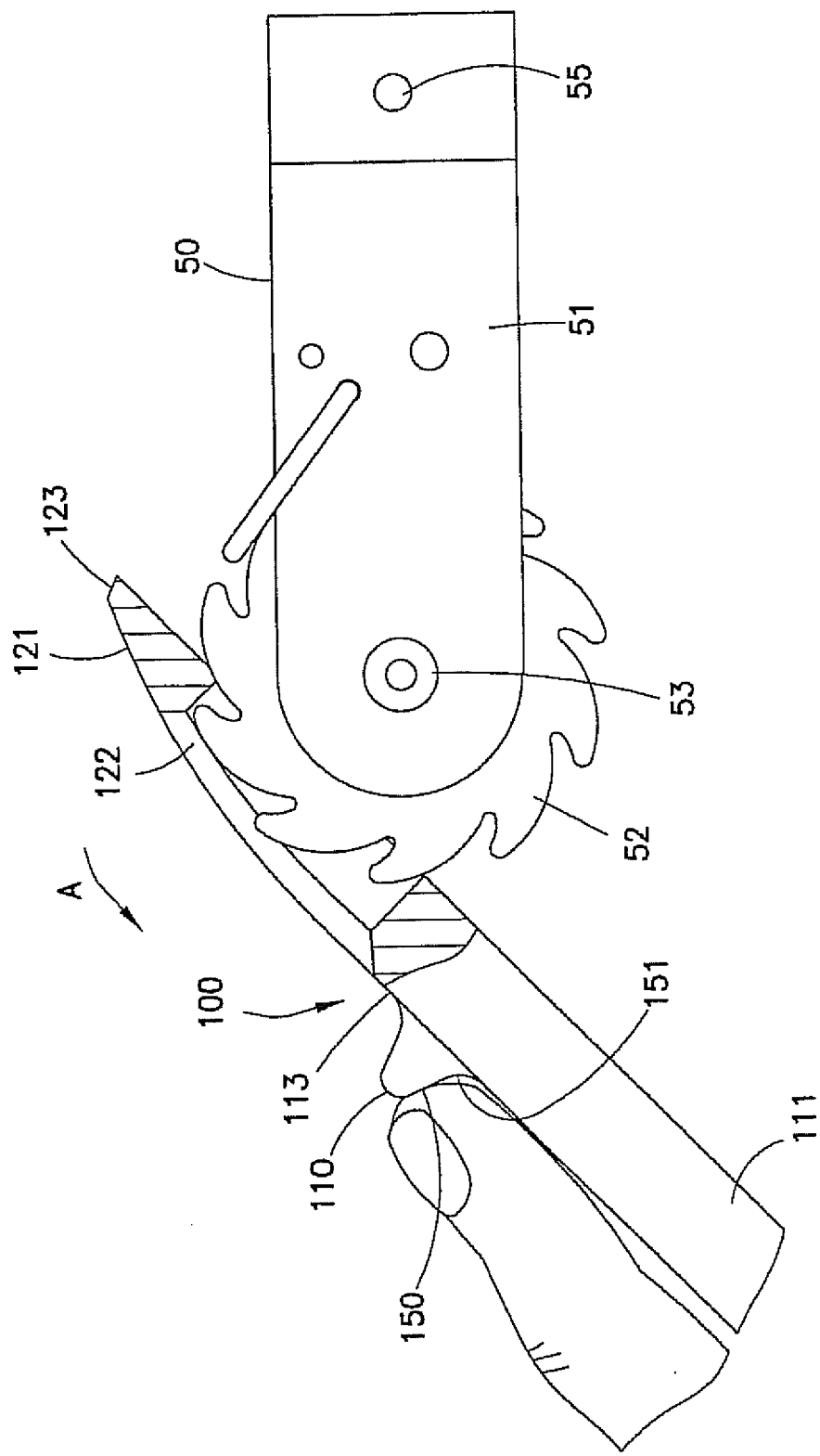
FIG. 8 is a right side elevational view of the tool of FIG. 7.

Referring to FIGS. 6-8, there is shown wire strainer 50. Strainer 50 has frame 51, a pair of discs, each disc is formed with a plurality of ratcheted sprocket teeth 52 disposed on a rotatable spool or pin 53 so as to rotate from a first ratcheted position to a second ratcheted position. Spring lock or compression clip 54 holds the teeth and a wire loop end in a ratcheted position for purposes hereinafter appearing. Aligned through holes 55 enable an anchoring such as a length of a first wire loop end (not shown) to be threaded therethrough. A second wire loop end (not shown) is engaged by the teeth 52. The wire strainer is suspended between the first and second wire loop ends. The teeth when rotatably moved from the first to the second position strains the wire to the desired tension, as is well known in the fencing tool art. Strainer 50 may be one manufactured by Fi-Shock such as a 400-400 cc In Line Strainer with Comp Clip commercially available from Fishock.com or from Flemingoutdoors.com. Strainer 50 may also be the wire strainer as shown and described in US 2010/0051887, published Mar. 4, 2010 to Wooster et al. and in U.S. Pat. No. 6,820,862, granted Nov.

23, 2004 to Terzagi, which references are incorporated herein in their entireties by reference thereto. Like commercially available wire strainers are also within the contemplation of the present invention.

Referring specifically to FIGS. 7 and 8, there is shown the fencing tool 100 and wire strainer 50 combination aspect of the present invention. Tool 100 is constructed as previously described tool 10, including wedge 121, wedge edge 123 and through hole 122, with the following modifications. Outwardly extending member 110 is formed on the bottom surface 113 of handle 111. Member 110 is formed with a grip portion that provides thumb guard 150 and thumb receiving recess 151. In the foregoing manner of construction, with tool 100 in the closed disposition, the user grips handle 111 at grip the portion disposed between the wedge and the means for pivotably connecting the handles with the fingers engaging the adjacent handle in the fully closed position, and the tool 100 contactingly engages at least one of the teeth 52 in through hole or slot 122. The grip portion, thumb guard 150 and thumb receiving recess 151 protect the user's hand from slipping in the following operations. The user then proximately moves or downwardly rotates tool 100 as shown by arrow A so as to provide a leverage force and cause teeth 52 to rotate in the arrow A direction. The teeth on one disc rotate with certain teeth engaging the second wire loop end so that the fence wire strained. The method is repeated until the desired tension is provided to the wires. Only one of the pair of discs has ratchet teeth disc engaged by tool 100. The other disc and pars of ratchet teeth are concomitantly rotated with the engaged disc and teeth.

Figure 9:
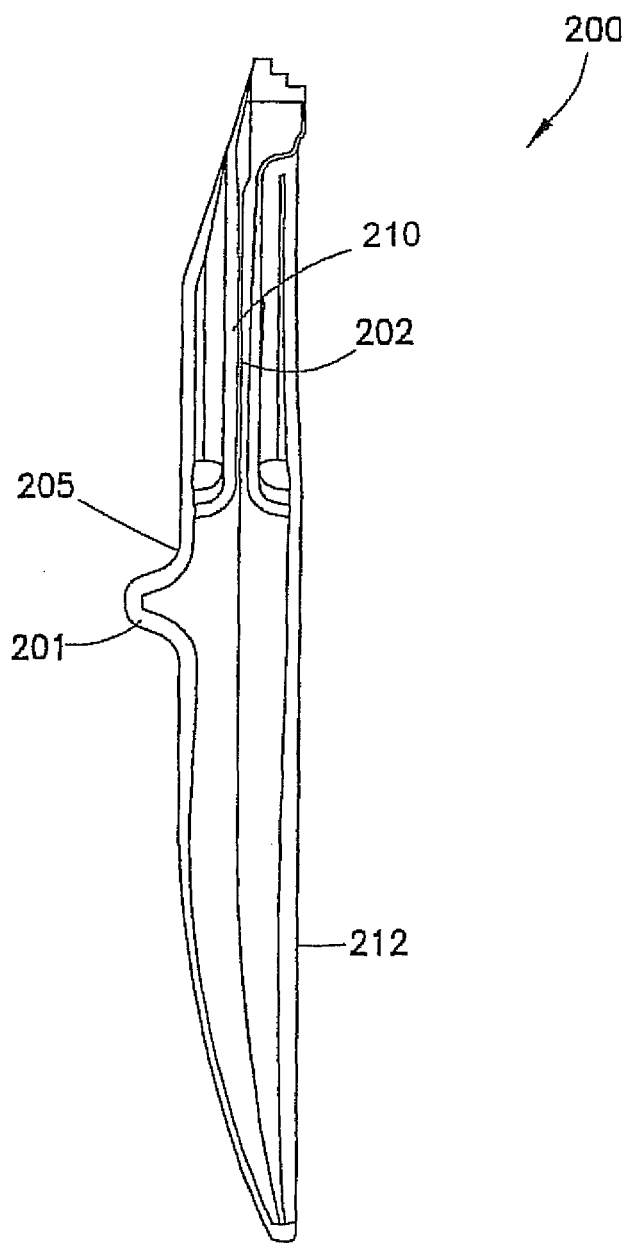
FIG. 9 is a side elevational of a third embodiment of the tool of FIGS. 1-5.

Referring specifically to FIG. 9, there is shown fencing tool 200 which has the fencing tool features of tools 10 and 200, with the following modifications. The embodiment 200 has wedge grip portion 210, and thumb guard 201, and is modified with a T-shaped section 202 disposed between the wedge 212 and the means for pivotally connection the handles. The T-section grip portion of FIG. 9 is shown and disclosed in commonly invented and owned U.S. Ser. No. 13/267,431, filed Oct. 6, 2011, now U.S. Pat. No. 8,291,794, which reference is incorporated herein its entirety by reference thereto. FIG. 9 shows thumb guard 201 and thumb receiving recess 205, formed by T-section 202.

Figure 5:
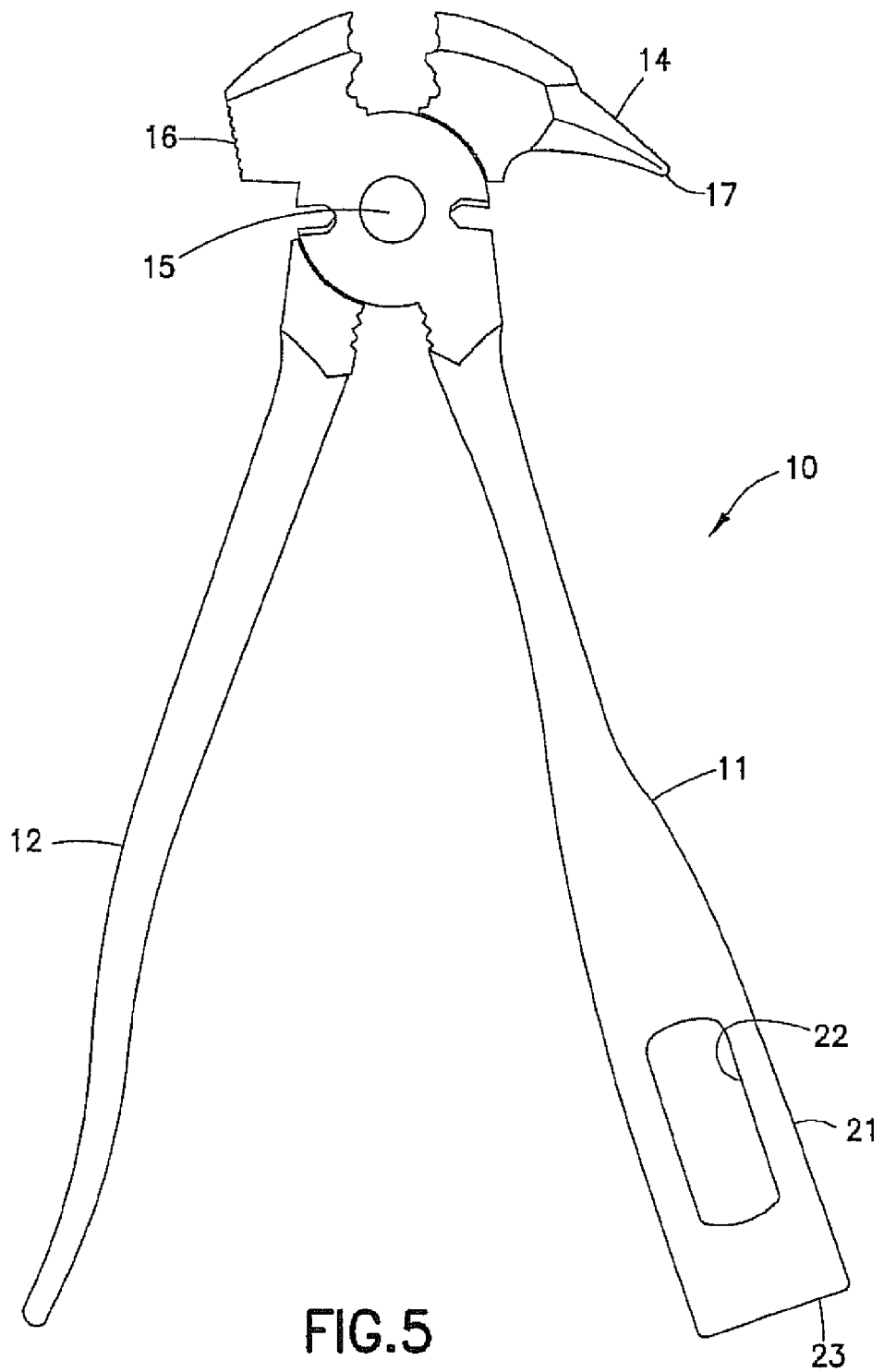
FIG. 5 is a front view as shown in FIG. in the opened disposition.

The tool of the present invention, when gripped particularly as shown in e.g. FIGS. 7-8, is particularly useful to have wedge edge inserted beneath the edge of a fence clip (not shown) to quickly remove the fence clip. Fence clips that may be readily removed in the foregoing manner are, by way of example, shown and disclosed in U.S. Pat. No. 6,050,549 to Foy ("Foy"), which reference is incorporated herein in its entirety by reference thereto. That is, the wedge edge may be inserted beneath the bottom edge of the Foy fence clip as shown in FIGS. 4-5 therein to unclip tabs 17 and 18, and thereby readily remove clip 10 from post 15.

While the present invention has been described with respect to certain specific embodiments, it should be understood that modifications and variations of the invention as afore-described might be constructed without departing from the spirit and scope of the invention as defined in the appended claims.

What is claimed is:

1. A method for operably engaging a wire strainer with a fencing tool comprising:
    (i) providing a fencing tool comprising a first handle and a second handle, and first and second, respective jaws, and means for pivotably connecting the handles and respective jaws, so that the tool is disposed respectively in an opened disposition and a closed disposition,
    said first handle comprises a first surface and a second surface and being formed with a wedge extending from the second surface upwardly to the first surface terminating at a wedge edge, and having a through slot extending from the first surface to the second surface;
    wherein the first handle first and second surfaces comprise a grip portion in the closed position;
    (ii) gripping the handles at the grip portion so that the first surface is downwardly and facingly disposed to a wire strainer having rotatably disposed teeth and the wedge edge is distally disposed;
    (iii) contactingly engaging the teeth in the through slot; and
    (iv) moving the tool to exert a force on the contactingly engaged teeth so as to rotate the teeth from a first position to a second position.

2. The method of claim 1, wherein the first handle grip portion is disposed between the wedge and the means for pivotably connecting the handles and jaws.

3. The method of claim 1, wherein the grip portion comprises a thumb receiving recess and a thumb guard.

4. The method of claim 3, wherein the first handle grip portion comprises a T-section.

5. The method of claim 1, said wire strainer further comprising means for mounting the wire stretcher between loop ends of the fence wire, and further comprising performing step (iv) with the strainer suspendedly mounted between the loop ends of fence wire.

6. The method of claim 1, said wire strainer plurality of teeth comprises a rotatably mounted first disc comprising a first plurality of teeth, and further comprising a rotatably mounted second disc comprising a second plurality of teeth, said discs being in parallel disposition, and wherein step (iii) further comprises contactingly engaging at least one of the first plurality and second plurality of teeth in the through slot.

7. The method of claim 1, wherein step (iv) further comprises rotatably downwardly moving the tool to cause the of teeth to rotate.

8. The method of claim 7, further comprising a first wire loop end engaging at least one of the teeth, and a second wire loop end engaging the strainer so that the strainer is suspended between the first and second wire loop ends.

9. A method for operably engaging a wire strainer with a fencing tool comprising:
    (a) providing a wire strainer and fencing tool combination said wire strainer comprises;
    a first handle and a second handle having first and second respective distally disposed jaws, and means for pivotably connecting the handles and respective jaws, so that the tool is disposed in an opened disposition and a closed disposition,
    said first handle comprises a first surface and a second surface and being formed with a wedge extending from the second surface upwardly to the first surface terminating at a wedge edge, and having a through slot extending from the first surface to the second surface; and
    said fence wire strainer comprises a plurality of teeth, and means for ratcheted rotatably mounting the teeth, so that the teeth are rotated from a first ratcheted position to a second ratcheted position to strain the fence wire, with the strainer being operably disposed with the fence wire;
    wherein the through slot engages at least one tooth of the plurality of strainer teeth with the wedge first surface downwardly and facingly disposed to the fence wire strainer;
    (b) gripping the handles gripped in the closed disposition to provide a first operable position; and (c) moving the fencing tool with the handles gripped in the first operable position and the wedge edge distally disposed so that the tool is moved downwardly and in the proximate direction, and the teeth are in turn rotated from the first position to a second position and consequentially straining the fence wire.

10. The method of claim 9, wherein the first handle grip portion is disposed between the wedge and the means for pivotably connecting the handles and jaws.

11. The method of claim 9, wherein the grip portion comprises a thumb receiving recess and a thumb guard.

12. The method of claim 11, wherein the first handle grip portion comprises a T-section.

\* \* \* \* \*